(12) United States Patent
Bhambare et al.

(10) Patent No.: US 12,539,737 B2
(45) Date of Patent: Feb. 3, 2026

(54) VEHICLE BASED ACCESSORY VENTILATION

(71) Applicant: Rivian IP Holdings, LLC, Plymouth, MI (US)

(72) Inventors: Kamalesh Bhambare, Novi, MI (US); Mayur Prakash Gaikwad, Irvine, CA (US); Aaron Kirk Hensler, South Lyon, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 483 days.

(21) Appl. No.: 18/105,699

(22) Filed: Feb. 3, 2023

(65) Prior Publication Data
US 2024/0217311 A1 Jul. 4, 2024

Related U.S. Application Data

(60) Provisional application No. 63/436,085, filed on Dec. 29, 2022.

(51) Int. Cl.
*B60H 1/26* (2006.01)
*B60H 1/00* (2006.01)
*B60P 3/36* (2006.01)

(52) U.S. Cl.
CPC ......... *B60H 1/267* (2013.01); *B60H 1/00821* (2013.01); *B60H 1/00985* (2013.01); *B60P 3/36* (2013.01)

(58) Field of Classification Search
CPC ......... E04H 15/06; E04H 15/10; E04H 15/12; E04H 15/14; E04H 15/16; B60H 1/26; B60H 1/265; B60H 1/267; B60H 1/00564; B60H 1/00821; B60H 1/00985; B60H 1/00657; B60P 3/34; B60P 3/341; B60P 3/36; B60P 3/38; B60P 3/39
See application file for complete search history.

(56) References Cited

U.S. PATENT DOCUMENTS

| 8,825,292 B2 | 9/2014 | Tseng et al. |
| 11,560,034 B1 | 1/2023 | Rocroi et al. |
| 2009/0027188 A1 | 1/2009 | Saban |

(Continued)

FOREIGN PATENT DOCUMENTS

| KR | 20170033635 A | * | 3/2017 | ......... B60H 1/00849 |
| KR | 20200015969 A | * | 2/2020 | ............. F24F 11/56 |

OTHER PUBLICATIONS

Tesla Motors Club "Tent Camping in a Model S" 2013; https://teslamotorsclub.com/tmc/threads/tent-camping-in-a-model-s.16248/ (Year: 2013).*

(Continued)

*Primary Examiner* — Steven B Mcallister
*Assistant Examiner* — Xiaoting Hu
(74) *Attorney, Agent, or Firm* — HG LAW LLP

(57) ABSTRACT

Some embodiments may provide a vehicle-based ventilation system for an accessory. The system may include a source of climate-controlled airflow, a duct, and an accessory climate sensor. The duct may include a source-end and an accessory-end. The source end may be configured to couple to the source of the climate-controlled airflow. The accessory-end may be configured to couple to an accessory. The accessory climate sensor may be positioned within the accessory.

16 Claims, 7 Drawing Sheets

(56) References Cited

U.S. PATENT DOCUMENTS

| | | | |
|---|---|---|---|
| 2009/0091477 A1 | 4/2009 | McCall et al. | |
| 2013/0346308 A1 | 12/2013 | Naito et al. | |
| 2016/0005285 A1 | 1/2016 | Balakrishna | |
| 2016/0320469 A1 | 11/2016 | Laifenfeld et al. | |
| 2017/0130680 A1 | 5/2017 | Dudar et al. | |
| 2017/0203626 A1 | 7/2017 | Guest et al. | |
| 2017/0282856 A1 | 10/2017 | Riedel et al. | |
| 2018/0072132 A1* | 3/2018 | Waldner | B60H 1/00564 |
| 2020/0130454 A1 | 4/2020 | Lundy et al. | |
| 2020/0198461 A1 | 6/2020 | Dudar | |
| 2021/0156705 A1 | 5/2021 | Pietryka et al. | |
| 2021/0291764 A1 | 9/2021 | Koda et al. | |
| 2022/0048472 A1 | 2/2022 | Nilsson et al. | |
| 2022/0063440 A1 | 3/2022 | Goldman-Shenhar et al. | |
| 2023/0086719 A1 | 3/2023 | Shin | |
| 2023/0101555 A1 | 3/2023 | Hundert et al. | |
| 2023/0138139 A1* | 5/2023 | Kang | B60P 3/36 |
| | | | 454/139 |
| 2023/0311607 A1 | 10/2023 | Rocroi et al. | |
| 2023/0311608 A1 | 10/2023 | Rocroi et al. | |
| 2023/0311609 A1 | 10/2023 | Bensaid et al. | |
| 2024/0240491 A1* | 7/2024 | Granados | E04H 15/14 |
| 2024/0286456 A1* | 8/2024 | Ingold | B60H 1/267 |

OTHER PUBLICATIONS

Tesla Motors Club "DIY Tent Air Conditioning" 2016; https://teslamotorsclub.com/tmc/threads/diy-tent-air-conditioning.78048/ (Year: 2016).*

R/teslamotors "I used my Tesla to air condition my tent on top of my Jeep Wrangler" 2019; https://www.reddit.com/r/teslamotors/comments/bu8jot/i_used_my_tesla_to_air_condition_my_tent_on_top/ (Year: 2019).*

Lambert, Fred. (Dec. 23, 2019). "Tesla releases 'Camp Mode'_making some happy campers", electrek, located at: a href="https://electrek.co/2019/12/23/tesla-camp-mode/" target="_blank"https://electrek.co/2019/12/23/tesla-camp-mode//a, retrieved Dec. 6, 2022.

Notice of Allowance mailed Jun. 29, 2022, for U.S. Appl. No. 17/710,803, filed Mar. 31, 2022, eight pages.

Youtube. (Mar. 22, 2022). "Rivian R1T Infotainment Deep Dive! Here's Every Screen & Menu", Located at: https://www.reddit.com/r/Rivian/comments/tk4ezr/comment/i1qq6ky/?utm_source=share&utm_medium=web2x&context=3, retrieved Dec. 6, 2022.

Non-Final Office Action mailed Apr. 17, 2023, for U.S. Appl. No. 18/091,039, filed Dec. 29, 2022, seven pages.

Non-Final Office Action mailed Apr. 19, 2023, for U.S. Appl. No. 18/091,240, filed Dec. 29, 2022, eight pages.

Final Office Action mailed Aug. 24, 2023, for U.S. Appl. No. 18/091,240, filed Dec. 29, 2022, ten pages.

Non-Final Office Action mailed Sep. 8, 2023, for U.S. Appl. No. 17/966,677, filed Oct. 14, 2022, five pages.

Notice of Allowance mailed Aug. 8, 2023, for U.S. Appl. No. 18/091,039, filed Dec. 29, 2022, five pages.

* cited by examiner

VEHICLE BASED ACCESSORY VENTILATION

CROSS-REFERENCE TO RELATED APPLICATIONS

This application claims the benefit of U.S. Provisional Application No. 63/436,085, filed Dec. 29, 2022, which is incorporated by reference herein in its entirety.

INTRODUCTION

Generally, traditional accessories of a vehicle may be climate controlled based on the environment or may have a self-contained climate-control unit. Such accessories may lack granular control over an accessory environment, or may be heavy and complex. It may be desirable for a user to utilize an existing climate-control unit (e.g., a climate control unit not associated with the accessory) to control the climate of an accessory.

BRIEF SUMMARY

Provided herein is a system for providing ventilation from a vehicle to an accessory which may improve a user's comfort associated with the accessory. In some embodiments, a vehicle-based ventilation system for an accessory may include a source of climate-controlled airflow, a duct, and an accessory climate sensor. The duct may include a source-end and an accessory-end. The source end may be configured to couple to the source of the climate-controlled airflow. The accessory-end may be configured to couple to an accessory. The accessory climate sensor may be positioned within the accessory.

In some embodiments, the source-end may be configured to couple to an air extractor. The air extractor may move air from a first area to a second area. The first area may include an interior of the vehicle.

In some embodiments, the source-end may be configured to couple to a vent of a vehicle.

In some embodiments, the source-end may be configured to couple to a window of a vehicle. The source-end may couple to the window by the source-end being held in place by the window against a window frame of the vehicle. The source-end may form a seal with the window when coupled to the window of the vehicle. When the source-end forms a seal with the window, the climate-controlled airflow may be directed to the accessory.

In some embodiments, the duct may include a tonneau cover. The tonneau cover may have openings. The openings may form at least a portion of the duct. The openings may form at least the portion of the duct when the tonneau cover is retracted.

In some embodiments, the source-end or the accessory-end may include a magnetic coupler. The magnetic coupler may couple to the source of the climate-controlled airflow or the accessory.

In some embodiments, the accessory climate sensor may include a temperature sensor, an air-quality sensor, a humidity sensor, or a solar radiation sensor.

In some embodiments, the accessory climate sensor may be wirelessly connected to a vehicle. The information captured by the accessory climate sensor may be used to determine a parameter of the climate-controlled airflow. The parameter may include a temperature or a fan speed of the climate-controlled airflow.

In some embodiments, the accessory climate sensor may be embedded in the accessory-end, the accessory, or a mobile device.

In some embodiments, the system may include a user interface. The user interface may be displayed on a display associated with a vehicle. The display may include a gauge display, an infotainment display, an accessory display, or a mobile device display. The user interface may include a setting to adjust a specified temperature within the accessory. The user interface may include information associated with a state of charge of the vehicle, a vehicle range, or a climate within the accessory.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DETAILED DESCRIPTION

Provided herein is a system for providing ventilation from a vehicle to an accessory which may improve a user's comfort associated with the accessory. In some embodiments, a vehicle-based ventilation system for an accessory may include a source of climate-controlled airflow, a duct, and an accessory climate sensor. The duct may include a source-end and an accessory-end. The source end may be configured to couple to the source of the climate-controlled airflow. The accessory-end may be configured to couple to an accessory. The accessory climate sensor may be positioned within the accessory.

In some embodiments, the source-end may be configured to couple to an air extractor. The air extractor may move air from a first area to a second area. The first area may include an interior of the vehicle.

In some embodiments, the source-end may be configured to couple to a vent of a vehicle.

In some embodiments, the source-end may be configured to couple to a window of a vehicle. The source-end may couple to the window by the source-end being held in place by the window against a window frame of the vehicle. The source-end may form a seal with the window when coupled to the window of the vehicle. When the source-end forms a seal with the window, the climate-controlled airflow may be directed to the accessory.

In some embodiments, the duct may include a tonneau cover. The tonneau cover may have openings. The openings may form at least a portion of the duct. The openings may form at least the portion of the duct when the tonneau cover is retracted.

In some embodiments, the source-end or the accessory-end may include a magnetic coupler. The magnetic coupler may couple to the source of the climate-controlled airflow or the accessory.

In some embodiments, the accessory climate sensor may include a temperature sensor, an air-quality sensor, a humidity sensor, or a solar radiation sensor.

In some embodiments, the accessory climate sensor may be wirelessly connected to a vehicle. The information captured by the accessory climate sensor may be used to determine a parameter of the climate-controlled airflow. The parameter may include a temperature or a fan speed of the climate-controlled airflow.

In some embodiments, the accessory climate sensor may be embedded in the accessory-end, the accessory, or a mobile device.

In some embodiments, the system may include a user interface. The user interface may be displayed on a display associated with a vehicle. The display may include a gauge display, an infotainment display, an accessory display, or a mobile device display. The user interface may include a setting to adjust a specified temperature within the accessory. The user interface may include information associated with a state of charge of the vehicle, a vehicle range, or a climate within the accessory.

Figure 1:
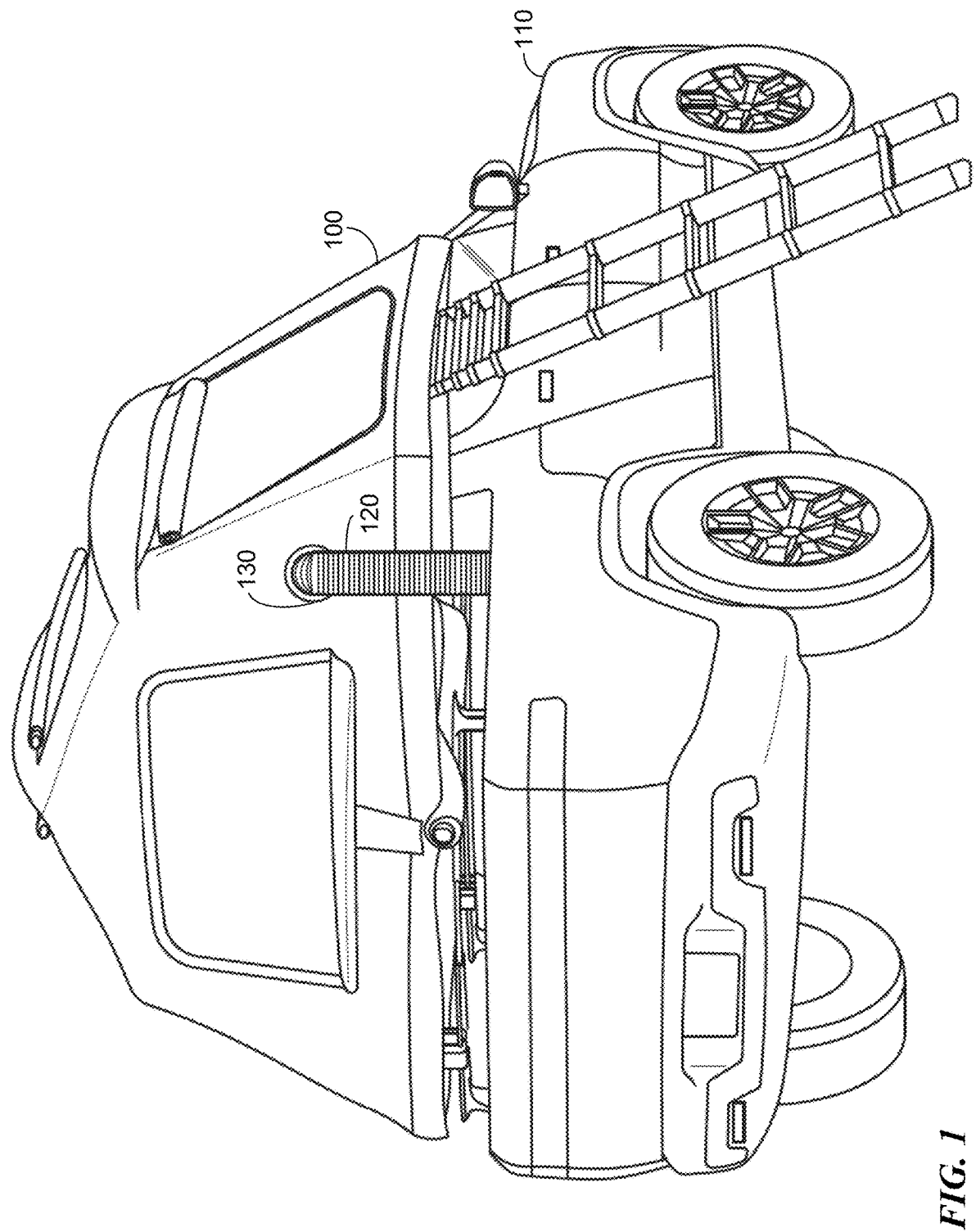
FIG. 1 illustrates an example configuration of an accessory on a pickup truck.

FIG. 1 illustrates an example configuration of an accessory 100 on pickup truck 110. In some embodiments, accessory 100 may be ventilated by a vehicle (e.g., truck 110, sedan, sport utility vehicle, golf cart, or all-terrain vehicle). The vehicle-based ventilation system may include a source of a climate-controlled airflow, duct 120, and an accessory climate sensor.

In some embodiments, the source of the climate-controlled airflow may be vehicle 110. The source may be air from a cabin of vehicle 110 or directly from a vent associated with a heating, ventilation, and air conditioning (HVAC) system.

In some embodiments, duct 120 may include source-end 140. Source-end 140 may be configured to couple to the source of the climate-controlled airflow. Source-end 140 may be magnetically coupled to the source of the climate-controlled airflow. Source-end 140 may be configured to couple to an air extractor. An air extractor may extract air from a first area to a second area. The first area may be an interior (e.g., cabin) of vehicle 110. The second area may be an interior of an accessory (e.g., tent or gazebo). The air extractor may prevent pressure build up in the cabin of the interior of vehicle 110 (e.g., when the HVAC system is active). In some embodiments, the air extractor may be in a bed of the vehicle. In some embodiments, the source end may be configured to couple to a condenser, radiator, fan module (CFRM). The CFRM may heat coolant for battery packs, motors, or a cabin HVAC system. The heat from the CFRM may be exhausted in the form of heated air. The heated air may be directed to the interior of an accessory.

In some embodiments, source-end 140 may be configured to couple to a vent of vehicle 110. The vent may be associated with the HVAC system. For example, the vent may be an outlet for the HVAC system. The vent may include front seat vents, middle seat vents, rear seat vents, cargo area vents (e.g., trunk or frunk vents), A-pillar vents, B-pillar vents, C-pillar vents, D-pillar vents, or floor vents.

In some embodiments, source-end 140 may be configured to couple to a window of a vehicle. The window may include a sunroof or a moonroof of vehicle 110. The window may also include a rear window between the passenger compartment and the bed of vehicle 110. Source-end 140 may couple to the window by source-end 140 being held in place by the window against a window frame or door frame of vehicle 110. For example, the window may be rolled up when source-end 140 is positioned in the window opening such that the window makes contact against source-end 140 and presses it against the window frame or door frame to restrict the movement of source-end 140. The source end may form a seal with the window and the frame (e.g., window frame or door frame). The seal may include a channel in source-end 140, a gasket, weather stripping, or an O-ring. Forming a seal between source-end 140 and the window and frame may direct the climate-controlled airflow to accessory 100. The seal may decrease loss of the climate-controlled airflow from the ventilation system to the outside environment. Furthermore, the seal may increase the amount of climate controlled airflow that reaches accessory 100.

In some embodiments, source-end 140 may be configured to couple to an opening of a vehicle. The opening may include a door opening, a trunk opening, or a frunk opening. The opening may also include a port in a bed of vehicle 110. Source-end 140 may couple to the opening by source-end 140 being held in place by the door, trunk, or frunk against a body of the vehicle.

In some embodiments, duct 120 may include a tonneau cover. The tonneau cover may include openings. The openings may be on each panel of the tonneau cover. The openings may form at least a portion of duct 120 when the tonneau cover is retracted. When the tonneau cover is retracted, the each panel is stacked against another panel. The panels may be stacked in any orientation, including in a vertical and a horizontal orientation. When each panel is stacked, each openings may be aligned and also stacked against a another opening to form the portion of duct 120.

In some embodiments, duct 120 may include accessory-end 130. Accessory-end 130 may be configured to couple to an accessory. Accessory-end 130 may be magnetically coupled to accessory 100.

In some embodiments, the accessory climate sensor may include a temperature sensor, an air-quality sensor, a humidity sensor, mass-airflow sensor, or a solar radiation sensor. The information captured by the accessory climate sensor may be used to determine a parameter of the climate-controlled airflow. The parameter may include a temperature or a fan speed. The parameter may also include a humidity or scents. The accessory climate sensor may be embedded in accessory-end 130, accessory 100, or a mobile device.

In some embodiments the accessory climate sensor may be wirelessly connected to a vehicle or a mobile device. The wireless connection may include BLUETOOTH, WI-FI, or other wireless communication protocols. The accessory climate sensor may also be connected to vehicle 110 by duct 120. For example, duct 120 may carry data between the accessory climate sensor and vehicle 110 when duct 120 is connected to accessory 100 and the source.

In some embodiments, the ventilation system may also include a user interface. The user interface may be displayed on a display associated with vehicle 110 (e.g., a gauge display, an infotainment display, an accessory display, or a mobile device display).

In some embodiments, the user interface may include a setting to adjust a specified temperature within accessory 100. The user interface may also include a current temperature inside accessory 100, a temperature inside vehicle 110, the specified temperature, a fan speed, a time to reach the specified temperature, or outside weather conditions. The user-interface may also include a status of vehicle 110 (e.g., state of charge or a vehicle range).

Figure 2:
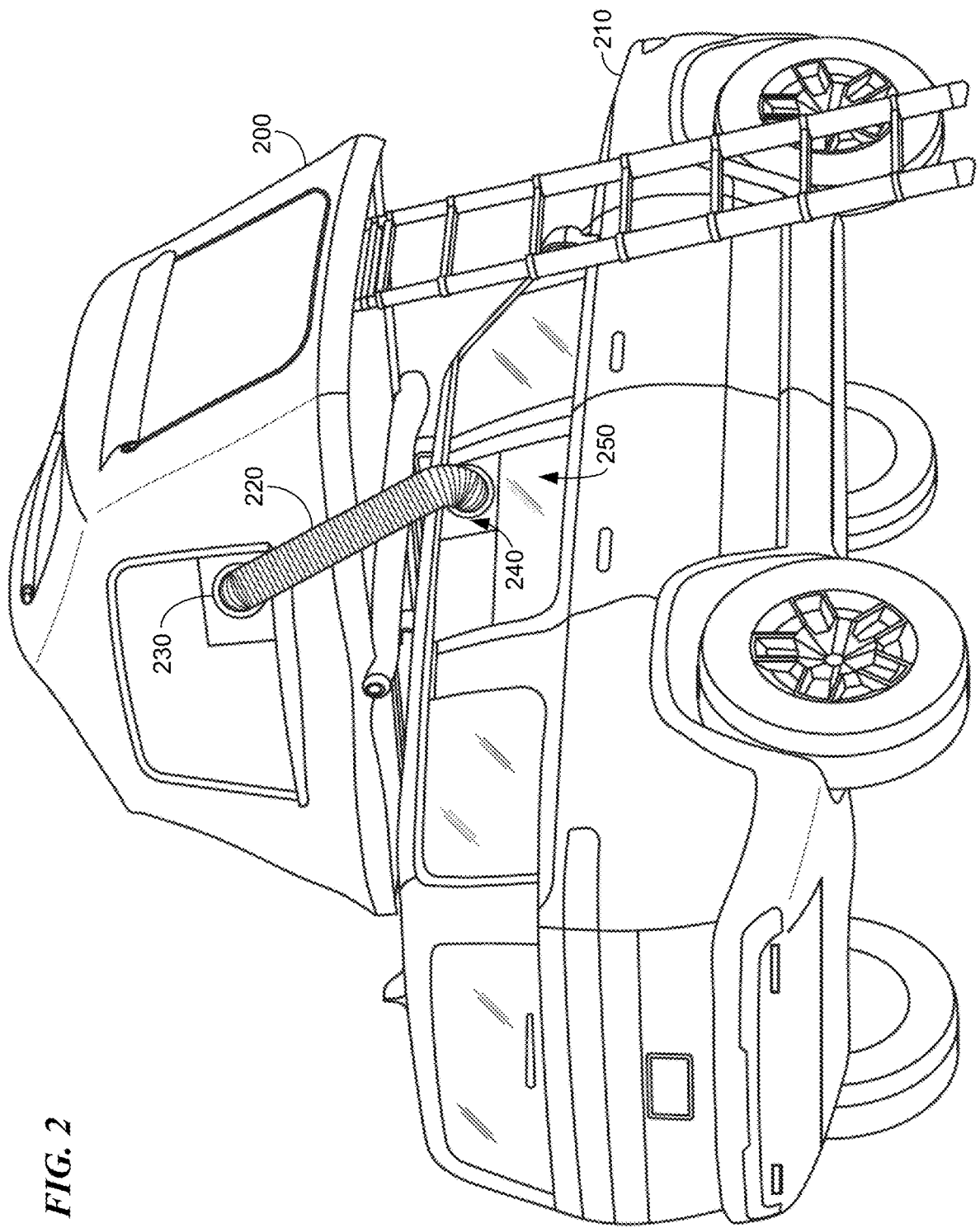
FIG. 2 illustrates an example configuration of an accessory on a sport-utility vehicle.

FIG. 2 illustrates an example configuration of an accessory 200 on a sport-utility vehicle 210. In some embodiments, accessory 200 may be ventilated by a vehicle (e.g., truck 210, sedan, sport utility vehicle 210, golf cart, or all-terrain vehicle). The vehicle-based ventilation system may include a source of a climate-controlled airflow, duct 220, and an accessory climate sensor.

In some embodiments, the source of the climate-controlled airflow may be vehicle 210. The source may be air from a cabin of vehicle 210 or directly from a vent associated with a heating, ventilation, and air conditioning (HVAC) system.

In some embodiments, duct 220 may include a source-end. Source-end 240 may be configured to couple to the source of the climate-controlled airflow. Source-end 240 may be magnetically coupled to the source of the climate-controlled airflow. Source-end 240 may be configured to couple to an air extractor. An air extractor may extract air from a first area to a second area. The first area may be an interior (e.g., cabin) of vehicle 210. The second area may be an interior of an accessory (e.g., tent or gazebo). The air extractor may prevent pressure build up in the cabin of the interior of vehicle 210 when the HVAC system is active.

In some embodiments, source-end 240 may be configured to couple to a vent of vehicle 210. The vent may be associated with the HVAC system. For example, the vent may be an outlet for the HVAC system. The vent may include front seat vents, middle seat vents, rear seat vents, cargo area vents (e.g., trunk or frunk vents), A-pillar vents, B-pillar vents, C-pillar vents, D-pillar vents, or floor vents.

In some embodiments, source-end 240 may be configured to couple to window 250 of vehicle 210. Window 250 may include a sunroof or a moonroof of vehicle 210. Source-end 240 may couple to window 250 by source-end 240 being held in place by window 250 against a window frame or door frame of vehicle 210. For example, window 250 may be rolled up when source-end 240 is positioned in the window opening such that window 250 makes contact against source-end 240 and presses it against the window frame or door frame to restrict the movement of source-end 240. Source end 240 may form a seal with window 250 and the frame (e.g., window frame or door frame). The seal may include a channel in source-end 240, a gasket, weather stripping, or an O-ring. Forming a seal between source-end 240 and window 250 and frame may direct the climate-controlled airflow to accessory 200. The seal may decrease loss of the climate-controlled airflow from the ventilation system to the outside environment. Furthermore, the seal may increase the amount of climate controlled airflow that reaches accessory 200.

In some embodiments, duct 220 may include an accessory-end. The accessory end may be configured to couple to an accessory. Accessory-end 230 may be magnetically coupled to accessory 200.

In some embodiments, the accessory climate sensor may include a temperature sensor, an air-quality sensor, a humidity sensor, or a solar radiation sensor. The information captured by the accessory climate sensor may be used to determine a parameter of the climate-controlled airflow. The parameter may include a temperature or a fan speed. The parameter may also include a humidity or scents. The accessory climate sensor may be embedded in accessory-end 230, accessory 200, or a mobile device.

In some embodiments the accessory climate sensor may be wirelessly connected to a vehicle or a mobile device. The wireless connection may include BLUETOOTH, WI-FI, or other wireless communication protocols. The accessory climate sensor may also be connected to vehicle 210 by duct 220. For example, duct 220 may carry data between the accessory climate sensor and vehicle 210 when duct 220 is connected to accessory 200 and the source.

In some embodiments, the ventilation system may also include a user interface. The user interface may be displayed on a display associated with vehicle 210 (e.g., a gauge display, an infotainment display, an accessory display, or a mobile device display).

In some embodiments, the user interface may include a setting to adjust a specified temperature within accessory 200. The user interface may also include a current temperature inside accessory 100, a temperature inside vehicle 210, the specified temperature, a fan speed, a time to reach the specified temperature, or outside weather conditions. The user-interface may also include a status of vehicle 210 (e.g., state of charge or a vehicle range).

Figure 3:
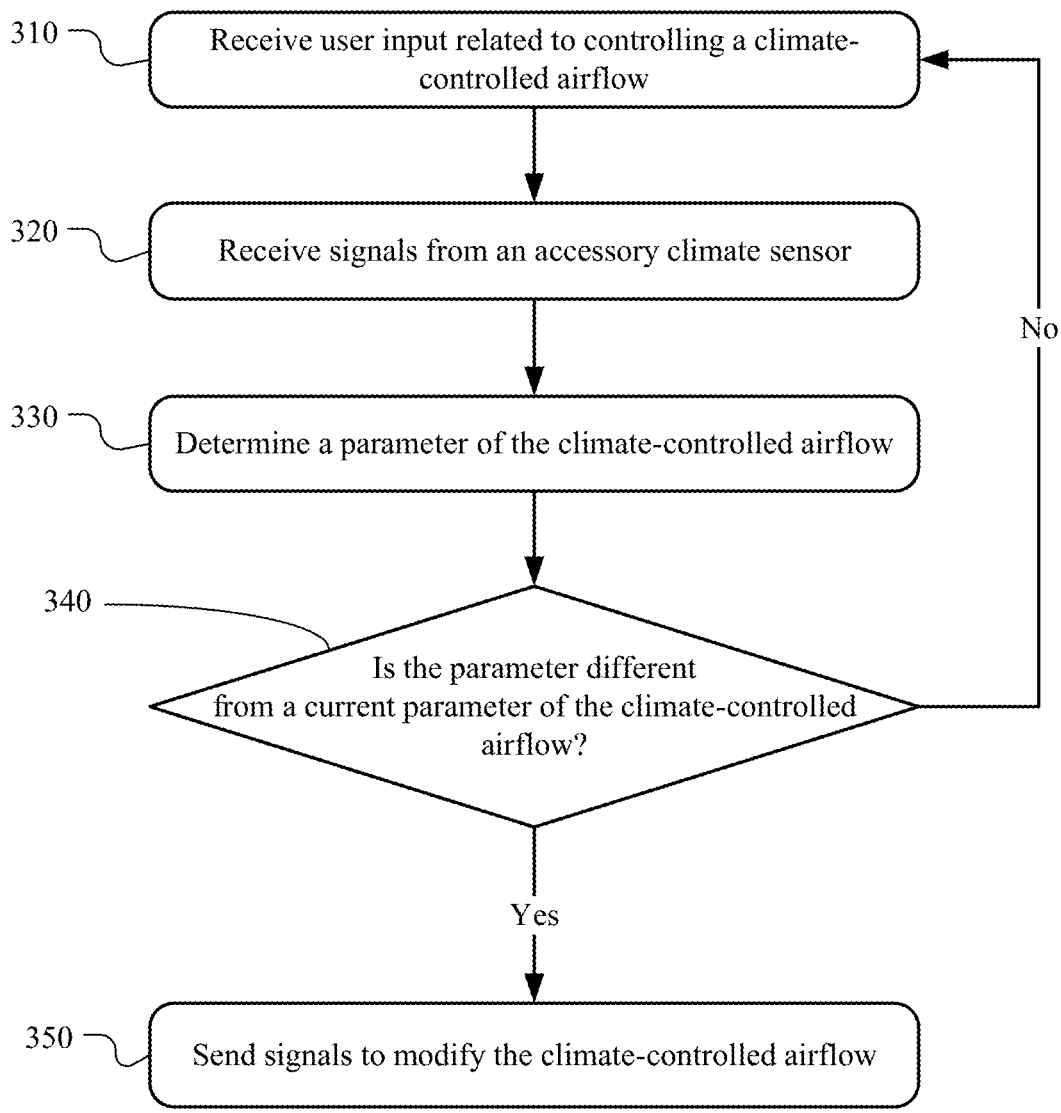
FIG. 3 is a flowchart illustrating steps of a method for providing ventilation to an accessory of a vehicle.

FIG. 3 is a flowchart illustrating steps of a method 300 for providing ventilation to an accessory of a vehicle. Method 300 may begin at step 310 with receiving user input related to controlling a climate-controlled airflow. Method 300 may then continue at step 320 with receiving signals from an accessory climate sensor. Method 300 may then continue at step 330 with determining a parameter of the climate-controlled airflow. The determination may be based on the user input or the signals. At decision point 340, the control module may determine whether the parameter is different from a current parameter of the climate-controlled airflow. If yes, method 300 may then continue at step 340 with sending signals to modify the climate-controlled airflow based on the parameter. Otherwise, if no, then method 300 may then return to step 310.

Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for providing ventilation to an accessory of a vehicle including the particular steps of the method of FIG. 3, this disclosure contemplates any suitable method for providing ventilation to an accessory of a vehicle including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
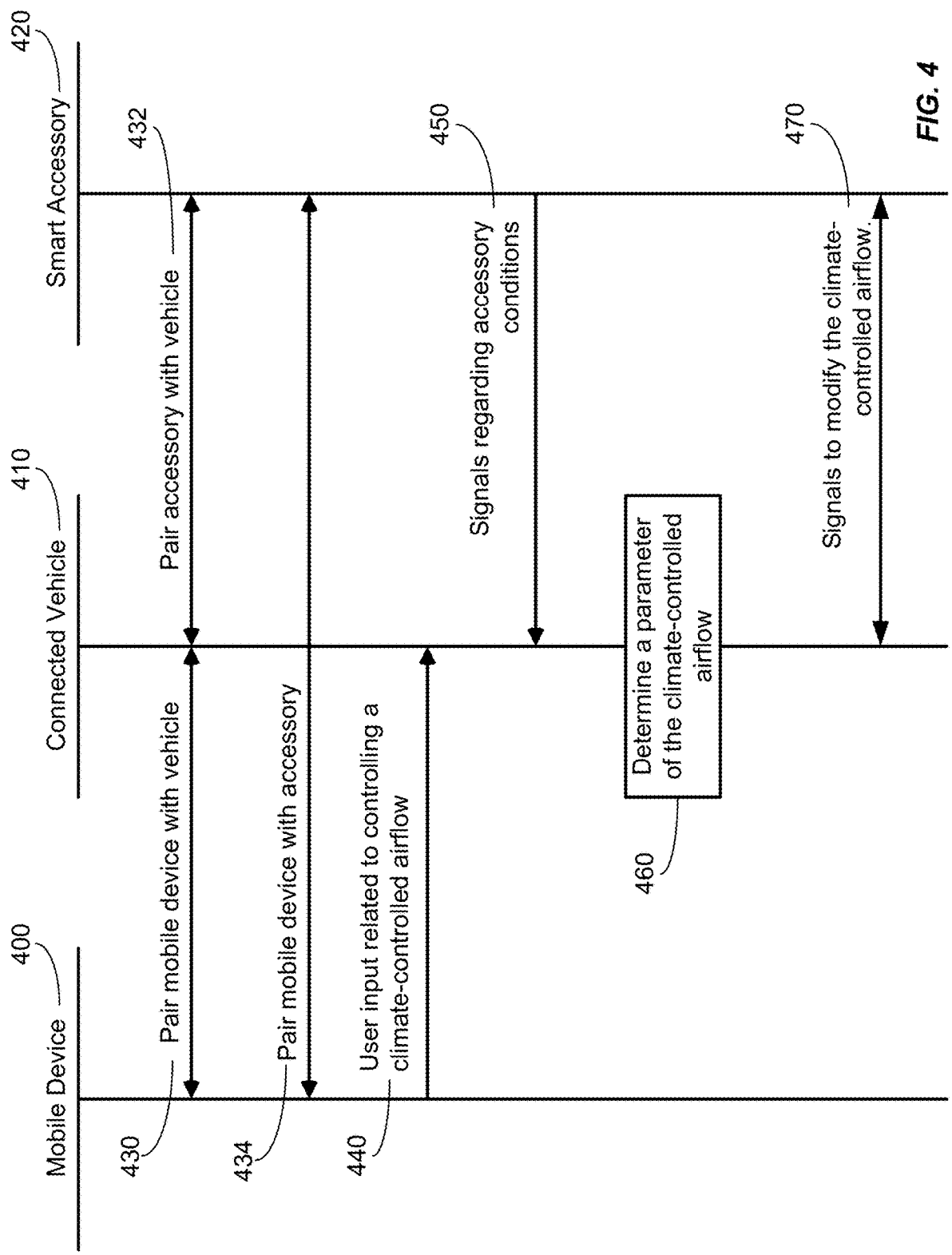
FIG. 4 is a diagram illustrating exchanges between a mobile device, a vehicle, and an accessory.

FIG. 4 is a diagram illustrating exchanges between mobile device 400, vehicle 410, and accessory 420. Mobile device 400 may be paired 430 with vehicle 410. Vehicle 410 may be paired 432 with accessory 420. Mobile device 400 may be paired 434 with accessory 420. User input related 440 to controlling a climate-controlled airflow may be sent from mobile device 400 and received by vehicle 410. Signals 450 may be sent from accessory 420 and received by vehicle 410. Vehicle 410 may determine a parameter 460 of the climate-controlled airflow. Signals 470 to modify the climate controlled airflow based on the parameter may be sent between vehicle 410 and accessory 420.

Figure 5:
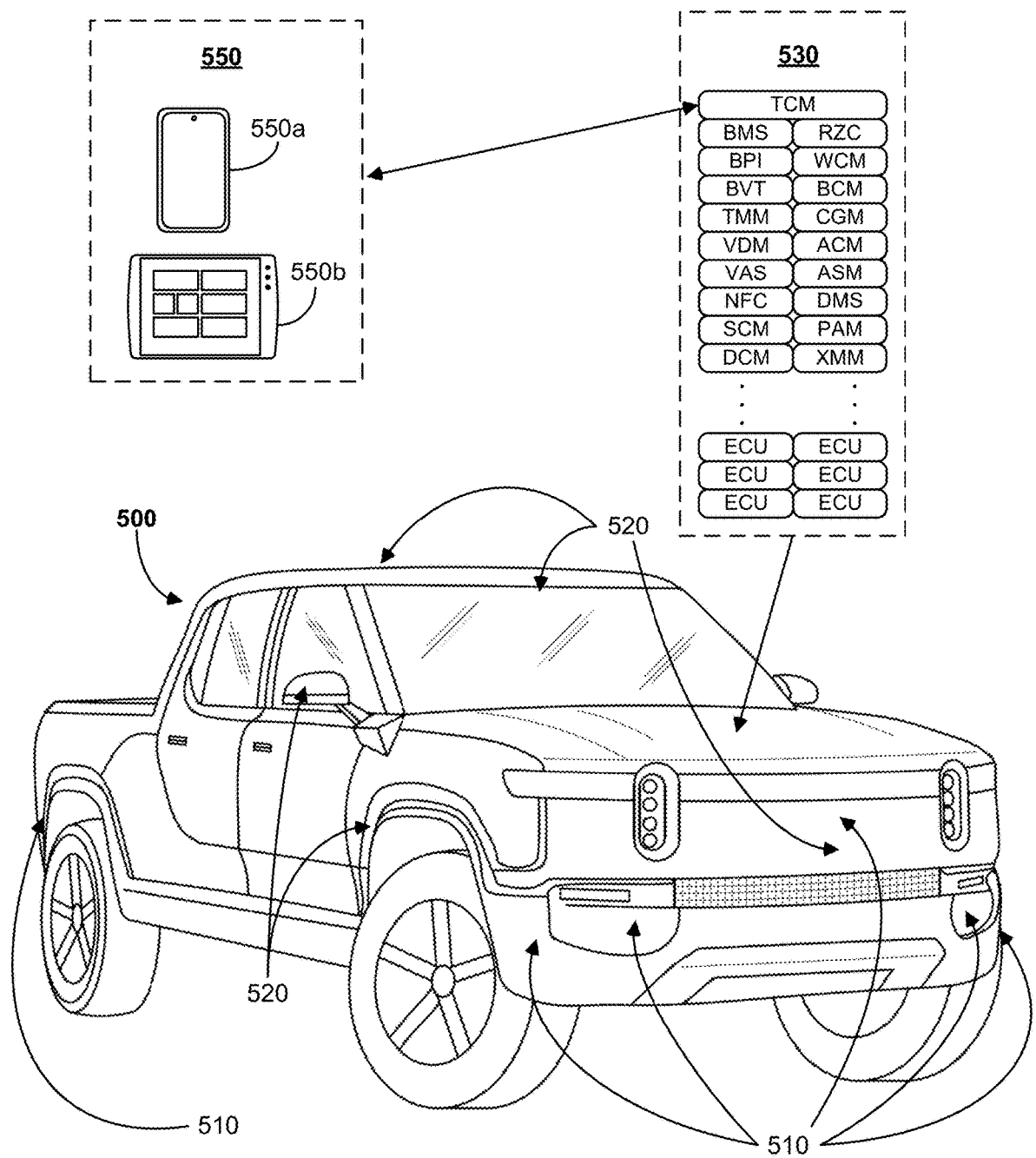
FIG. 5 illustrates an example vehicle.

FIG. 5 illustrates an example vehicle 500. Vehicle 500 may include multiple sensors 510, multiple cameras 520, and a control system 530. In some embodiments, vehicle 500 may be able to pair with a computing device 550 (e.g., smartphone 550a, tablet computing device 550b, or a smart vehicle accessory). As an example and not by way of limitation, a sensor 510 may be an accelerometer, a gyroscope, a magnometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 520 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 500 may include various controllable components (e.g., doors, seats, windows, lights, HVAC, entertainment system, security system), instrument and information displays and/or interactive interfaces, functionality to pair a computing device 550 with the vehicle (which may enable control of certain vehicle functions using the computing device 550), and functionality to pair accessories with the vehicle, which may then be controllable through an interactive interface in the vehicle or through a paired computing device 550.

Control system 530 may enables control of various systems on-board the vehicle. As shown in FIG. 5, control system 530 may comprise one or more electronic control units (ECUs), each of which are dedicated to a specific set of functions. Each ECU may be a computer system (as described further in FIG. 7), and each ECU may include functionality provide by one or more of the example ECUs described below.

Features of embodiments as described herein may be controlled by a Thermal Management Module (TMM) ECU. The TMM ECU may provide electronic controls for HVAC components that control the temperature within a passenger cabin of the vehicle, including, by way of example and not limitation, sensing cabin temperature, heating and cooling of the cabin, and controlling HVAC mode (foot mode, defrost/demist), the electronic air compressor, the HVAC blower, the air vents, and the cabin heater. The TMM ECU may also or alternatively control heating and cooling of the battery pack and cooling of drive units (inverters), including, by way of example and not limitation, controlling the speed of the radiator fan, heating and cooling of energy storage system (ESS), monitoring ESS coolant temperature sensors, cooling of powertrain, and monitoring powertrain coolant temperature sensors.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 550, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 530.

Vehicle 500 may include one or more additional ECUs, such as, by way of example and not limitation: a Central Gateway Module (CGM) ECU, a Vehicle Dynamics Module (VDM) ECU, a Vehicle Access System (VAS) ECU, a Near-Field Communication (NFC) ECU, a Body Control Module (BCM) ECU, a Seat Control Module (SCM) ECU, a Door Control Module (DCM) ECU, a Rear Zone Control (RZC) ECU, an Autonomy Control Module (ACM) ECU, an Autonomous Safety Module (ASM) ECU, a Driver Monitoring System (DMS) ECU, and/or a Winch Control Module (WCM) ECU. If vehicle 500 is an electric vehicle, one or more ECUs may provide functionality related to the battery pack of the vehicle, such as a Battery Management System (BMS) ECU, a Battery Power Isolation (BPI) ECU, and/or a Balancing Voltage Temperature (BVT) ECU.

Figure 6:
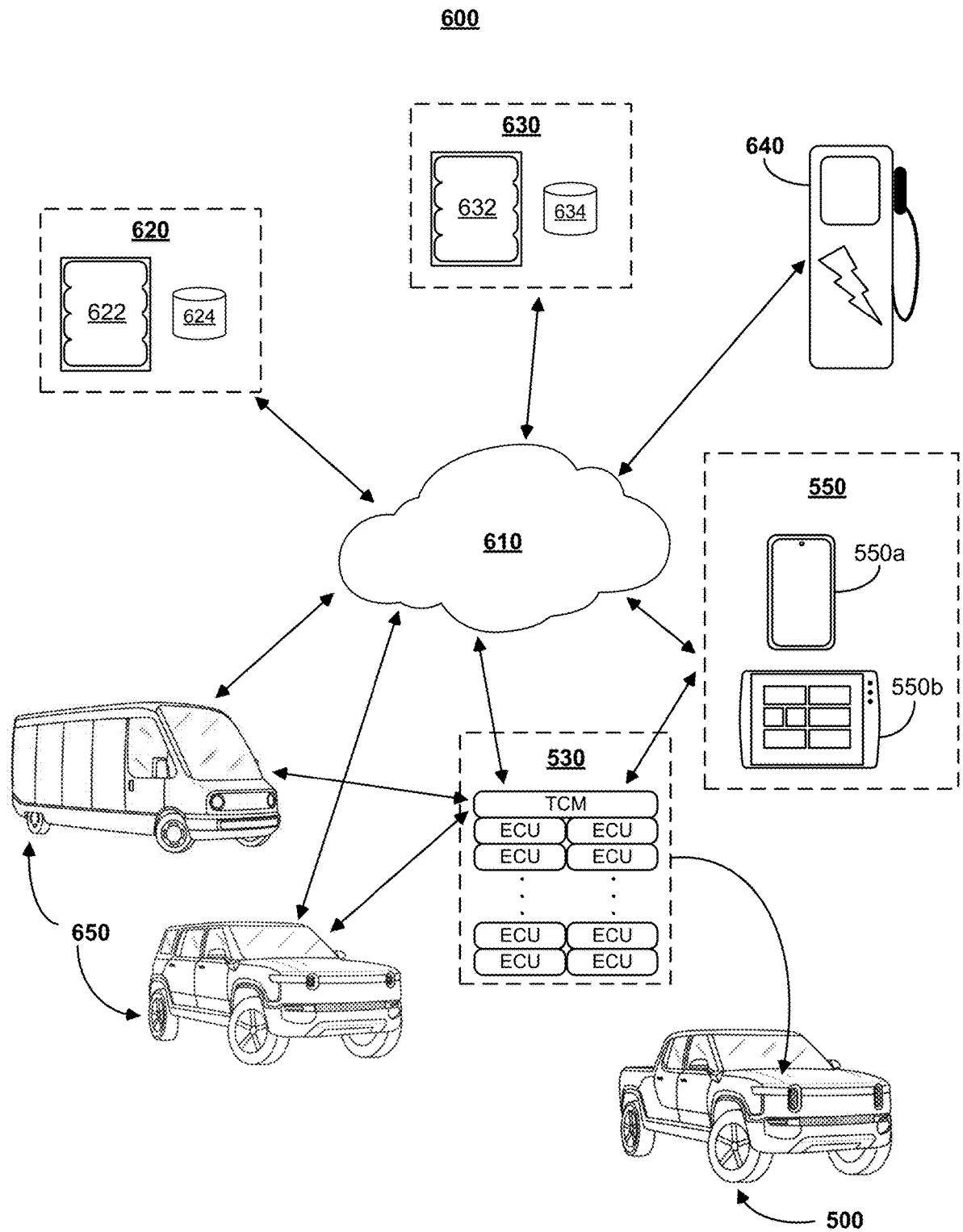
FIG. 6 illustrates an example network system including a connected vehicle.

FIG. 6 illustrates an example networked environment 600. Computer system 600 may include a connected vehicle 500 with a control system 530 that is capable of transmitting data to/from a network 610. Network 610 may also be connected to one or more computing servers 620 (e.g., including compute units 622 and storage units 624) associated with a vehicle manufacturer, a vehicle service provider, a vehicle fleet operator, or a vehicle-charging facility provider. Network 610 may also be connected to one or more third-party computing servers 630 (e.g., including compute units 632 and storage units 634) associated with, for example, a smart accessory manufacturer, a group event organizer, service provider, or a governmental organization. Networked environment 600 may include one or more landscape features 640 (e.g., automated toll road sensors, smart road signs or road markers, automated toll gates, power dispensers at charging stations). Networked environment 600 may also include other connected vehicles 650 that may be capable of communicating with vehicle 500 through network 610 and/ or directly with vehicle 500 (e.g., by communicating with a TCM ECU of a control system 530 of vehicle 500 when connected vehicle 650 is within range of a short-range communications network, such as Bluetooth). Networked environment 600 may also include one or more computing devices 550 (e.g., smartphone 550a, a tablet computing device 550b, or a smart vehicle accessory) capable of communicating with network 610 and/or directly with vehicle 500.

Networked environment 600 may enable transmission of data and communications between any of the depicted elements. In some embodiments, such information may be communicated in only one direction (e.g., a smart road sign broadcasting information related to traffic control or delays due to construction); in other embodiments, information may include two-way communications (e.g., an automated toll gate that processes a request received from vehicle 500 to deduct a toll from a specified account and provides confirmation of the transaction). In particular embodiments, one or more elements of networked environment 600 may include one or more computer systems, as described in further detail with respect to FIG. 7A. In particular embodiments, one or more elements of networked environment 600 perform one or more steps of one or more methods described or illustrated herein. In particular embodiments, software running on one or more elements of networked environment 600 may be controlled by a single entity to perform one or more steps of one or more methods described or illustrated herein or provide functionality described or illustrated herein.

Figures 7A, 7B:
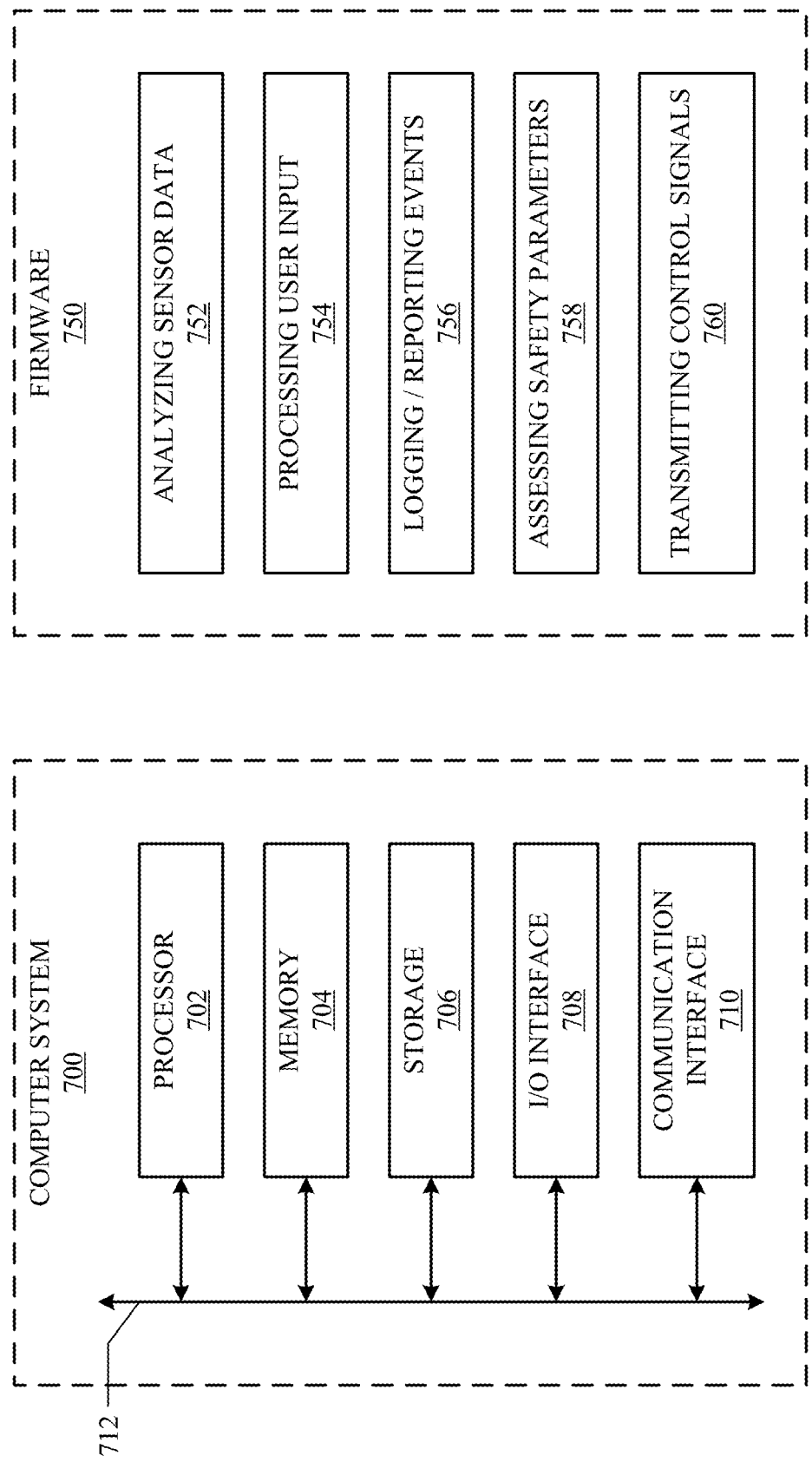
FIG. 7A is a schematic of an example computer system.
FIG. 7B illustrates example firmware for a vehicle ECU.

FIG. 7A illustrates an example computer system 700. Computer system 700 may include a processor 702, memory 704, storage 706, an input/output (I/O) interface 708, a communication interface 710, and a bus 712. Although this disclosure describes one example computer system including specified components in a particular arrangement, this disclosure contemplates any suitable computer system with any suitable number of any suitable components in any suitable arrangement. As an example and not by way of limitation, computer system 700 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 700 may include one or more computer systems 700; be unitary or distributed, span multiple locations, machines, or data centers; or reside in a cloud, which may include one or more cloud components in one or more networks. Where appropriate, computer system(s) 700 may perform, at different times or at different locations, in real time or in batch mode, one or more steps of one or more methods described or illustrated herein.

Processor 702 (e.g., compute units 622 and 632) may include hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706 (e.g., storage units 624 and 634). Processor 702 may include one or more internal caches for data, instructions, or addresses.

In particular embodiments, memory 704 includes main memory for storing instructions for processor 702 to execute or data for processor 702 to operate on. In particular embodiments, one or more memory management units (MMUs) reside between processor 702 and memory 704 and facilitate accesses to memory 704 requested by processor 702. In particular embodiments, memory 704 includes random access memory (RAM). This disclosure contemplates any suitable RAM.

In particular embodiments, storage 706 includes mass storage for data or instructions. As an example and not by way of limitation, storage 706 may include a removable disk drive, flash memory, an optical disc, a magneto-optical disc, magnetic tape, or a Universal Serial Bus (USB) drive or two or more of these. Storage 706 may include removable or fixed media and may be internal or external to computer system 700. Storage 706 may include any suitable form of non-volatile, solid-state memory or read-only memory (ROM).

In particular embodiments, I/O interface 708 includes hardware, software, or both, providing one or more interfaces for communication between computer system 700 and one or more input and/or output (I/O) devices. Computer system 700 may be communicably connected to one or more of these I/O devices, which may be incorporated into, plugged into, paired with, or otherwise communicably connected to vehicle 500 (e.g., through the TCM ECU). An input device may include any suitable device for converting volitional user input into digital signals that can be processed by computer system 700, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 510 described above. An output device may include devices designed to receive digital signals from computer system 700 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 708 for them. I/O interface 708 may include one or more I/O interfaces 708, where appropriate.

In particular embodiments, communication interface 710 includes hardware, software, or both providing one or more interfaces for data communication between computer system 700 and one or more other computer systems 700 or one or more networks. Communication interface 710 may include one or more interfaces to a controller area network (CAN) or to a local interconnect network (LIN). Communication interface 710 may include one or more of a serial peripheral interface (SPI) or an isolated serial peripheral interface (isoSPI). In some embodiments, communication interface 710 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 712 includes hardware, software, or both coupling components of computer system 700 to each other. Bus 712 may include any suitable bus, as well as one or more buses 712, where appropriate. Although this disclosure describes a particular bus, any suitable bus or interconnect is contemplated.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

FIG. 7B illustrates example firmware 750 for a vehicle ECU 700 as described with respect to control system 530. Firmware 750 may include functions 752 for analyzing sensor data based on signals received from sensors 510 or cameras 520 received through communication interface 710. Firmware 750 may include functions 754 for processing user input (e.g., directly provided by a driver of or passenger in vehicle 500, or provided through a computing device 550) received through I/O interface 708. Firmware 750 may include functions 756 for logging detected events (which may be stored in storage 706 or uploaded to the cloud), as well as functions for reporting detected events (e.g., to a driver or passenger of the vehicle through an instrument display or interactive interface of the vehicle, or to a vehicle manufacturer, service provider, or third party through communication interface 710). Firmware 750 may include functions 758 for assessing safety parameters (e.g., monitoring the temperature of a vehicle battery or the distance between vehicle 500 and nearby vehicles). Firmware 750 may include functions 760 for transmitting control signals to components of vehicle 500, including other vehicle ECUs 700.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A vehicle-based ventilation system for an accessory comprising:
   a source of a climate-controlled airflow;
   a duct comprising:
      a source-end configured to couple to the source of the climate-controlled airflow; and
      an accessory-end configured to couple to the accessory, wherein the duct comprises a tonneau cover having openings that form at least a portion of the duct; and
   an accessory climate sensor positioned within the accessory.

2. The system of claim 1, wherein the source-end is further configured to couple to an air extractor.

3. The system of claim 2, wherein the air extractor moves air from a first area to a second area, wherein the first area comprises an interior of a vehicle.

4. The system of claim 1, wherein the source-end is further configured to couple to a vent of a vehicle.

5. The system of claim 1, wherein the openings form the at least a portion of the duct when the tonneau cover is retracted.

6. The system of claim 1, wherein the source-end or the accessory-end comprises a magnetic coupler to couple to the source of the climate-controlled airflow or the accessory respectively.

7. The system of claim 1, wherein the accessory climate sensor comprises a temperature sensor, an air-quality sensor, a humidity sensor, or a solar radiation sensor.

8. The system of claim 1 wherein the accessory climate sensor is wirelessly connected to a vehicle.

9. The system of claim 8, wherein information captured by the accessory climate sensor is used to determine a parameter of the climate-controlled airflow, wherein the parameter comprises a temperature or a fan speed of the climate-controlled airflow.

10. The system of claim 1, wherein the accessory climate sensor is embedded in the accessory-end, the accessory, or a mobile device.

11. The system of claim 1, wherein the system further comprises a user interface, wherein the user interface is optionally displayed on a display associated with a vehicle.

12. The system of claim 11, wherein the display comprises a gauge display, an infotainment display, an accessory display, or a mobile device display.

13. The system of claim 11, wherein the user interface comprises a setting to adjust a specified temperature within the accessory.

14. The system of claim 11, wherein the user interface comprises information associated with a state of charge of the vehicle, a vehicle range, or a climate within the accessory.

15. A method of providing ventilation to an accessory of a vehicle, the method comprising:
   receiving, by a control module of the vehicle, user input related to controlling a climate-controlled airflow through a duct, wherein the duct comprises a tonneau cover having openings that form at least a portion of the duct;
   receiving, by the control module, signals from an accessory climate sensor;

determining, by the control module based on the user input and the signals, a parameter of the climate-controlled airflow; and sending, by the control module and based on the parameter, signals to modify the climate-controlled airflow.

16. A non-transitory computer-readable medium comprising instructions that, when executed by one or more processors of one or more computing devices, cause the one or more processors to:

receive user input related to controlling a climate-controlled airflow through a duct, wherein the duct comprises a tonneau cover having openings that form at least a portion of the duct;

receive signals from an accessory climate sensor;

determine, based on the user input and the signals, a parameter of the climate-controlled airflow; and send, based on the parameter, signals to modify the climate-controlled airflow.

* * * * *